Sept. 10, 1968 T. KRAUS ET AL 3,400,585
METHOD OF MEASURING THE OUTPUT OF A SOURCE OF A CERTAIN GAS
Filed July 14, 1965 2 Sheets-Sheet 1
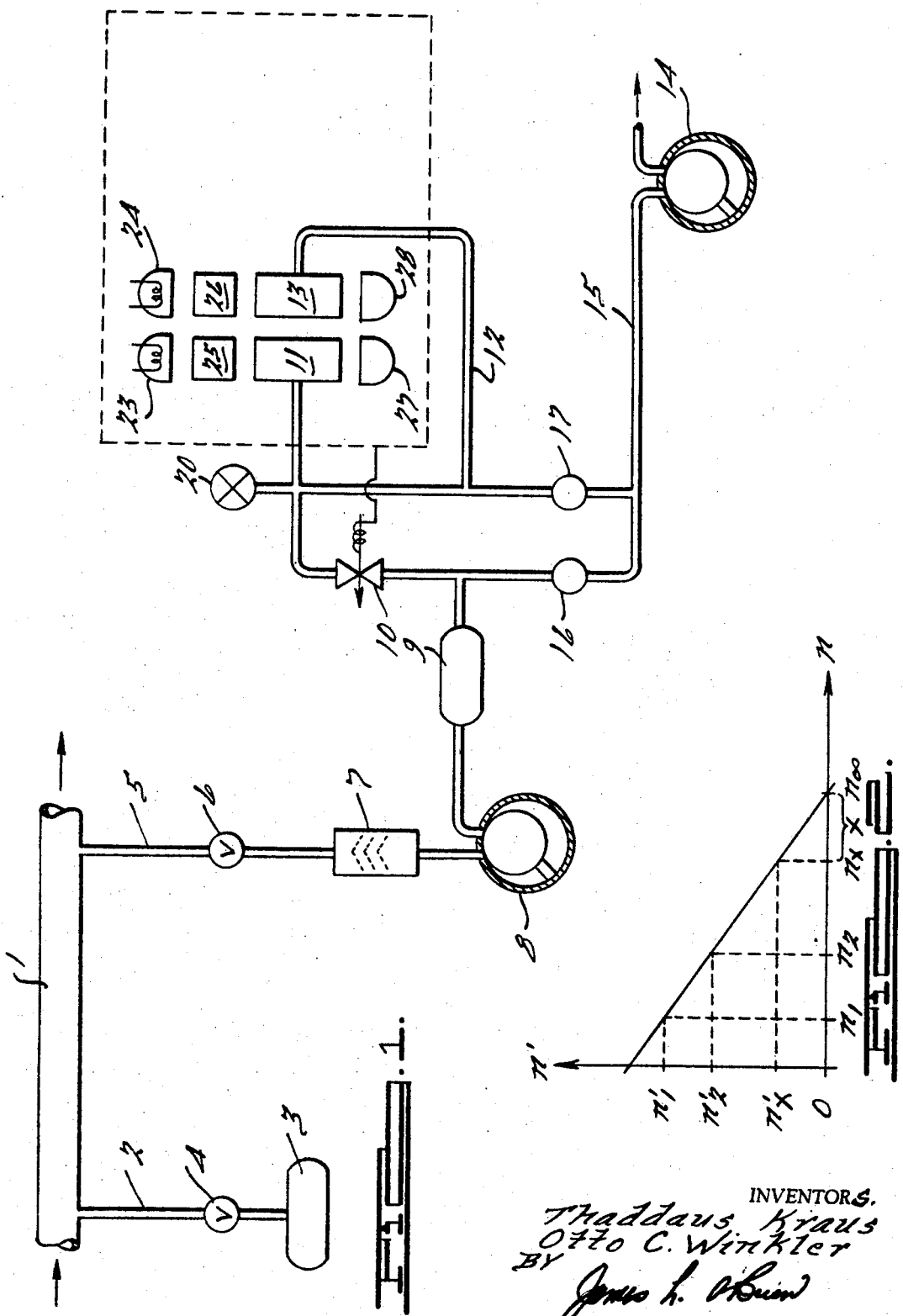
INVENTORS.
Thaddaus Kraus
Otto C. Winkler
BY
James L. O'Brien
ATTORNEY.

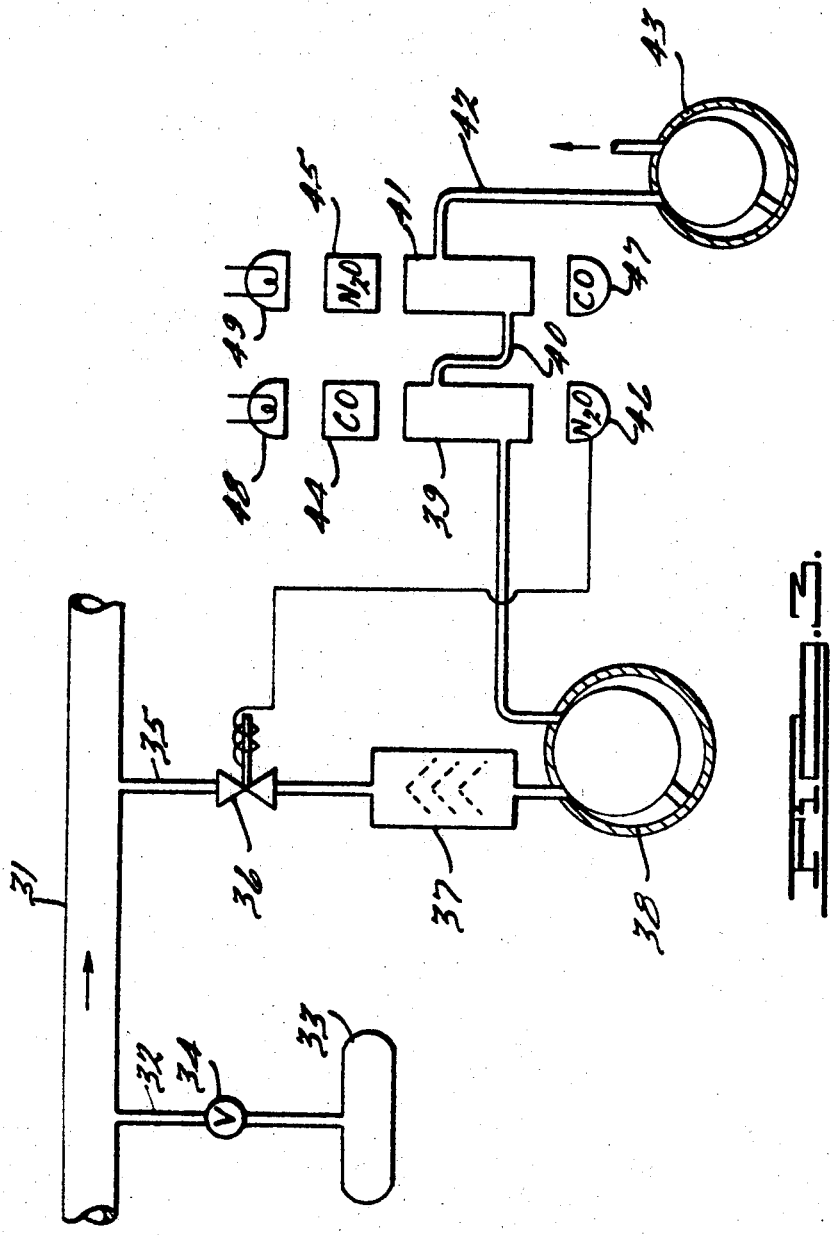

United States Patent Office 3,400,585
Patented Sept. 10, 1968

3,400,585
METHOD OF MEASURING THE OUTPUT OF A SOURCE OF A CERTAIN GAS
Thaddaus Kraus, Vaduz, and Otto C. Winkler, Balzers, Liechtenstein, assignors to Bendix Balzers Vacuum, Inc., Rochester, N.Y., a corporation of Delaware
Filed July 14, 1965, Ser. No. 471,800
Claims priority, application Switzerland, July 23, 1964, 9,647/64
4 Claims. (Cl. 73—194)

ABSTRACT OF THE DISCLOSURE

A method of measuring the quantity of a gas evolved by a source. A small quantity of an auxiliary or reference gas is added to the gaseous products being evolved by a gas source. This combination is passed through partial pressure measuring devices and by comparing measured partial pressures and the known quantity of auxiliary gas introduced, the quantity of the gas to be measured is directly measurable. By employing as pressure reference a gas in the system, differential measurements are substituted for absolute measurements and non-linearities, and irregularities in pump suction and gas flow do not affect the final measurement.

According to the prior art, the yield or output of a gas source can be determined if no absorption is present by filling a known volume with the gas and measuring the pressure of the gas from which the quantity contained in the given volume can be calculated with consideration being made for the temperature. The time required by the gas source to produce this quantity may be converted into its output capacity or yield. This known method is cumbersome and applies only to the total quantity of a gas (but not to its components, in the case of a mixture) and it cannot be used to determine the capacity of gas sources when gas absorption or losses occur at the same time.

Another known method consists in determining the quantity of the evolved gas by passing the gas through a restriction and measuring its pressure upstream and downstream of the restriction. This method has the disadvantages of producing an inaccurate reading because of the pressure differences created, of considerably reducing the flow capacity in the section of the line used for the measurement, and also of being difficult to calculate due to the non-linearity of the flow characteristics.

The present invention has as its object to provide a method and an apparatus for determining quickly and with a great accuracy the output of a gas source, the absorption of this gas, and in addition the output and absorption of other gases, in which, with the help of a simple circuit the measured value can immediately be read off.

The method according to the present invention is characterized in that an auxiliary gas, not previousucly contained in the flow produced by the source, is added to the gas flow given off from the source and at a point further downstream, the ratio between the partial pressure of the gas to be determined and the partial pressure of the auxiliary gas is measured; this measurement representing a proportional measure of the yield of the gas source. The measurement of the ratio of the partial partial pressures may also be carried out on a part of gas mixture separated or branched from the main stream.

As an example, in order to determine the quantity of a specified gas produced by a gas source, such as a vacuum melt, during a predetermined time period, a part or fraction of the gas mixture consisting of the principal gas to be measured and the auxiliary gas is directed by means of a pump through a suitable partial pressure measuring device where the ratio of the partial pressures is measured, said ratio representing very closely a proportionate measure of the quantity of the principle gas given up by the gas source during the specified time period.

In a supplementary embodiment of the present invention, a feeder branch is connected at a first point to the main line carrying the gas produced by the source to introduce the auxiliary gas into the main line; and at another point, located further downstream, an output branch is provided through which part of the mixture of main gas and auxiliary gas may be sampled out by means of a pumping device having its output connected to instruments for measuring the partial pressures of the main gas and of the auxiliary gas. A regulating valve is inserted in the output branch and is operatively connected to the auxiliary gas partial pressure meter which acts as a sending means in such a manner as to automatically adjust the valve to maintain a constant predetermined partial pressure of the auxiliary gas in the partial pressure measuring devices during the time period measurements are being made.

The method and apparatus of the present invention are described in the following description taken in connection with the appended drawings in which:

FIGURE 1 is a schematic view of apparatus embodying the present invention;

FIGURE 2 is a graph explicative of some aspects of the method of the present invention; and FIGURE 3 is a schematic view of another embodiment of the present invention.

The arrangement represented in FIGURE 1 shows a main pipe or line 1 to carry the gas mixture to be measured in the direction shown by the arrows. A feeder pipe or branch line 2 leading from a supply container 3 through valve 4 discharges auxiliary gas into the main line for addition to the main gas. At a point further downstream in the main pipe, a branch 5 is provided for a part of the gas mixture consisting of the main gas to be measured and the auxiliary gas, which is connected through a valve 6 to a pumping device which, in this example, consists of a diffusion pump 7 and a fore pump 8. The output of the pumping device is in communication with a fore chamber 9, which acts as a gas collecting chamber, and through valve 10 with the measuring chamber 11 of a partial pressure meter for the main gas, for which the yield of its source is to be determined, and through the connection 12 with a further partial pressure meter 13 for the auxiliary gas. The partial pressure meter may be of any variety of design so long as they permit the measurement of the partial pressures of the single gas component to be determined and of the auxiliary gas.

As auxiliary equipment, FIGURE 1 further shows a pump 14 with a suction connection 15 and valves 16 and 17 for the evacuation of various parts of the measurement system before the beginning of each measurement. Numeral 20 designates a heat conductivity measuring gauge. The advantage of the last named instrument as well as the importance of parts designated by the numerals 23 to 28 can be further seen below.

This arrangement, for example, is suitable for continuous control of the gas content and the gas evolution of metal melts. For this purpose the gas mixture given up from the melt at reduced pressure, which generally consists of hydrogen, nitrogen and oxygen, is pumped through the main line 1 and simultaneously the auxiliary gas is added in measured amounts through the pipe 2 from the container 3. A part of the gas mixture consisting of the gas to be measured and the auxiliary gas is collected in the fore chamber 9 during a specified time interval through the connection 5 and the valve 6 and the pumping devices 7 and 8. In this way the gas mixture is permitted to enter through the opening of valve 10 into the measuring chambers 11 and 13 of the partial pressure meters until a predetermined pressure of the auxiliary gas, which is easily attainable and conveniently measurable, is reached. Following this, the partial pressures are measured of the auxiliary gas and of the gas component for which the yield of the source is to be determined. The ratio of main gas partial pressure to the auxiliary gas partial pressure represents a proportional measures of the desired quantity. By adjusting the partial pressure of the auxiliary gas to a fixed value remaining constant throughout a series of measurements, the scale of the partial pressure gauge can be calibrated directly in gas quantity per second (e.g., mol/sec.) as a measure of the yield. The described method has the advantage over all other known methods in that it is completely insensitive during the measurement to all possible fluctuations of the resistance to gas flow in the main line or in the measurement connection branching off from it. Such fluctuations can appear, for example, on account of changes of the suction capacity of the connected pumps with time or through the closing of valves in the main connection or by the operation of the equipment with incompletely closed or opened valves. The measuring method according to the invention offers the further advantage that in the case of the measurement of the gas evolution during a prespecified time period it gives a proper average value of the yield of the source or an integral value independent of any variation of the rate of the gas evolution during this time and further independent of the rate of flow of the gas in the main line.

With reference to the carrying out of the partial pressure measurements, it should be noted that for specific gases corresponding pressure measuring instruments are known, for example, those utilizing vacuum apparatus separated from the space containing the gas to be measured by a wall of material which is permeable only for the specified gas such as, for example, heated palladium for hydrogen. Other partial pressure measuring instruments are based on specific physical and chemical properties of the specified gas. As is well known, the mass spectrometer represents a generally applicable partial pressure measuring instrument.

The practical example shown in FIGURE 1 provides a heat conductivity measurement cell 20 which can serve as a partial pressure gauge for hydrogen. The heat conductivity of the gas mixture in which the cell is immersed generally remains in a fixed relationship to its hydrogen content, if other gases with a similar heat conductivity are not present, such as in special cases in the outgassing of melts.

The partial pressure measurement method has been described as based on well known principles but is especially suitable for the particular purpose of the present invention. It can be used for the determination of the partial pressure of a gas with the help of an infra red absorption measuring instrument.

The chambers, simply designated as partial pressure measuring chambers 11 and 13, can be formed as the absorption cell of an infra red absorption instrument. In addition, the infra red light sources 23 and 24, the filter cells 25 and 26, which can be filled with filter gases, and the radiation receivers 27 and 28, which can be made selective through a specified gas filling, can be provided for both of the light paths. With this apparatus and the valve arrangement shown, the determination of the partial pressures can then be undertaken in a different manner. For the simple measurement of the CO evolution from a vacuum melted metal laughing gas $N_2O$ is supplied as the auxiliary gas, one filter cell 25 is filled with CO, the other cell 26 with $N_2O$, the radiation receiver 27 is filled with $N_2O$, and the receiver 28 with CO. The two absorption measuring instruments are appropriately adjusted to the zero point of an adjustable scale. The pumping means 7 and 8 discharge the gas mixture into the fore chamber 9 from which it flows into the two measuring chambers until the absorption in the measuring system 23, 25, 11 and 27 has undergone a specified change which corresponds to a specified partial pressure of the auxiliary gas $N_2O$. The other measuring system 24, 26, 13 and 28 then shows the amount of CO formed corresponding to the absorption change so that its scale may be calibrated directly in the amount of CO.

FIGURE 2 shows how data obtained by the previous embodiment, not directly useable for the continuous observation of the gas content of a melt, can be evaluated. This data can be used to obtain a definite gas content of the melt as is necessary, for example in the production of "semi-killed" steels. Plotted on the abscissa in arbitrary units are the integral amounts of gas N which are given up by the melt beginning from a measuring time zero point. Plotted on the ordinate, also in arbitrary units, is the rate or velocity N' of the gas evolution, i.e., the amount of gas evolved per unit time. The gas evolution per unit time N' is directly proportional to the remaining amount of gas still available in the melt and, therefore, represents a linear measure of this residual amount of gas. However, N' is still dependent on the temperature of the melt and numerous other physical or chemical parameters. The relationship referred to may be represented by a family of straight lines in FIGURE 2 in which a single straight line is shown, with the temperature and other physical chemical variables being stated as parameters. These relationships can be evaluated with greater accuracy for gas content determinations for melts in connection with the process according to the present invention.

For this purpose, the gas evolution of the melt is measured during a specified time interval and recorded in a diagram according to FIGURE 2. The abscissa indicates the amount of gas contained in the melt in arbitrary units, for example, the number of mols, while the ordinate indicates the amount of gas evolved per unit time $dN/dt = N'$. The point $N_1$ can be arbitrarily placed on the abscissa. The distance of the point $N_2$ from $N_1$, which represents the change in the gas content of the melt that the melt undergoes while the velocity of the gas evolution changes from $N_1'$ to $N_2'$, is obtainable by integration of the gas evolution from $N_1$ to $N_2$ and can be plotted on the abscissa in the arbitrarily chosen units. Other pairs of values for the diagram can be determined in an analogous manner. From at least two pairs of values $N_1-N_1'$ and $N_2-N_2'$, one obtains as a diagram a piece of straight line, which corresponds to the prevailing outgassing conditions. The piece of straight line obtained from the measurements may be extended to cut the abscissa at $N_\infty$ where the point of intersection obviously represents a completely degassed melt with respect to the measured components. The amount of residual gas X to which one wishes to degas the melt is plotted on the abscissa in the units of the abscissa from this point $N_\infty$ in the direction of the origin, arriving in this way at an abscissa point $N_x$. The ordinate corresponding to the point $N_x$ then establishes the magnitude of the rate $N_x'$ of the gas evolution, which can be exactly measured by the arrangement according to the present invention, to which the melt must be degassed in order to attain the specified residual gas content. Up to this time, no other process and no apparatus has been known in which the simple measurement of the gas evolution during a short time interval may be used to determine the residual gas content. The present invention makes it possible to do this in a simple manner utilizing the graphically illustrated method of determination which in practice can be easily automated by means of simple calculating apparatus.

The following formula may be deduced from FIGURE 2:

$$N_x' = \frac{N_1' - N_1'}{N_1 - N_2} N_x$$

Because of the dependence on molecular weight of the diffusion coefficient and different transport phenomena associated with it, such as diffusion and molecular flow, it is recommended that, when possible, a gas be chosen as the auxiliary gas whose molecular weight does not deviate substantially from the molecular weight of the gas component to be determined.

Referring now to the embodiment shown in FIGURE 3, numeral 31 designates a main line to carry the gas mixture to be measured in the direction indicated by the arrow, and which may, for example, originate in a vacuum melting furnace.

A feeder line 32 is connected to the main line to provide a flow path for the auxiliary gas which is taken from storage container 33 through valve 34. At a point further downstream in the main line a branch 35 is provided for a part of the mixture of main and auxiliary gas, which connects through regulating valve 36 to a pumping device, in this example a diffusion pump 37 and a fore pump 38. The output of this pumping device connects to the measuring chamber 39 of a partial pressure meter for the auxiliary gas, and that chamber connects through line 40 with the measuring chamber 41 for the gas for which the yield of the source is to be determined. The two partial pressure meters may be of any variety of design as long as they permit the measurement of the partial pressures of the gas component to be measured and of the auxiliary gas. The gas mixture is continually exhausted from chamber 41 through line 42 and pump 43.

To execute a measurement, the gas mixture liberated from the source under subatmospheric pressure is pumped through the main line 31, and simultaneously, the auxiliary gas is added from container 33 through line 32 in a measured quantity which is small in comparison to the gas to be determined. A part of the mixture consisting of main gas and auxiliary gas is continuously carried through line 35 and valve 36 by the pumping device 37, 38 and through chambers 39 and 41 of the partial pressure meters.

FIGURE 3 shows the partial pressure meters in a schematic manner as a known infra red absorption type, the example assuming that the gas component to be measured is CO and the auxiliary gas is $N_2O$. Two separate beams are provided for the separate measurement of the IR absorption of the auxiliary gas and the gas to be determined (the absorption representing a measure of the partial pressure). In the beam shown at the left in the drawing (through chamber 39) a filter cartridge 44 filled with CO is arranged to completely remove that portion of the beam from source 48 which can be absorbed by CO. Thus, the CO portion of the gas mixture present in measuring chamber 39 has no effect on the beam reaching receiving cell 46. It will only register the partial pressure of the auxiliary gas $N_2O$ with which it is filled. On the other hand, in the measuring beam shown at the right in the drawing, the filter cartridge 45 filters from the beam from source 49 that portion which can be absorbed by the auxiliary gas, thus making this beam insensitive to the auxiliary gas, but leaving it sensitive to CO, the absorption of which is indicated by receiving cell 47 which is filled with CO.

In accordance with this embodiment of the invention, the partial pressure indicator for the auxiliary gas is so designed that it acts as a signal source for regulating valve 36 in such a manner that the flow of gas mixture is automatically adjusted to maintain in measuring chamber 39 a predetermined, constant and conveniently measurable partial pressure of the auxiliary gas during the period of measurement. If this requirement is met, the partial pressure indicated by the instrument for the gas whose flow is to be determined represents a direct measure of the yield of its source, so that the indicator may be calibrated directly in units of flow of gas per second. In order to achieve a low inertia of the regulating valve 36 and, thereby, a small time constant of the regulating circuit, it is recommended to design the moving valve body with low mass, for example, in the form of an adjustable diaphragm.

The measuring procedure described herein possesses a great advantage over all known methods serving this same purpose, in that it is fully independent of any variations in the resistance to gas flow occurring in the main line or in the measuring line branch, during the period of measurement. Such variations may, for example, be due to temporary changes in the suction capacities of the pumps connected to the system, or the closing of valves in the main line.

In place of the IR absorption measurement, other devices may be used to determine the partial pressures. For example, partial pressure measuring devices are known, in which the pressure measuring system proper is separated from the chamber which contains the gas mixture by a partition which permits passage of only a certain gas, such as heated palladium for hydrogen. Other partial pressure indicators are based on specific physical or chemical properties of certain gases.

The mass spectrometer is known to be applicable as a general purpose partial pressure indicator. If an instrument is available which permits the independent determination of the aforementioned partial pressures, it may be used instead of several special partial pressure indicators.

We claim:

1. A method for the measurement of the output of a main source of a specified gas comprising the steps of confining the main gas evolved from the main source into a gas flow path, injecting into said flow path a known quantity of auxiliary gas not previously contained in the main gas, and selected to have approximately the same molecular weight as the specified gas, removing from the flow path a portion of the mixture of the main gas and auxiliary gas, measuring the partial pressures of the specified gas and of the auxiliary gas and determining the output of the main source of specified gas from the ratio of said partial pressures.

2. The method of claim 1 wherein the partial pressure of the specified gas is measured while maintaining the partial pressure of the auxiliary gas at a predetermined value.

3. The method of claim 1 in which the auxiliary gas is $N_2O$ and in which the partial pressure of the auxiliary gas is determined by infra red absorption measurement.

4. The method of claim 1 in which the quantity of mixture removed from the flow path is regulated as a function of the partial pressure of the auxiliary gas.

References Cited

UNITED STATES PATENTS

| 2,386,831 | 10/1945 | Wright | 73—23 X |
| 2,861,450 | 11/1958 | Ransley | 73—19 |
| 3,176,500 | 4/1965 | Coe | 73—19 |
| 3,177,700 | 4/1965 | Sier | 73—19 |
| 3,221,537 | 12/1965 | Jacobsen | 73—23 |
| 2,456,163 | 12/1948 | Watson | 73—23 |
| 2,671,337 | 3/1954 | Hulsberg | 73—23 |

RICHARD C. QUEISSER, *Primary Examiner.*

EDWARD D. GILHOOLY, *Assistant Examiner.*